(12) United States Patent
Kukulski et al.

(10) Patent No.: US 8,448,244 B1
(45) Date of Patent: May 21, 2013

(54) METHODS AND SYSTEMS FOR FUSED FILES COMPRISING LOGIC AND CONTENT DATA

(75) Inventors: Tim Kukulski, Oakland, CA (US); Robert Benson Walton, San Francisco, CA (US); Allan Padgett, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 532 days.

(21) Appl. No.: 12/684,282

(22) Filed: Jan. 8, 2010

(51) Int. Cl.
*G06F 11/00* (2006.01)
(52) U.S. Cl.
USPC .......................................... 726/22; 713/187
(58) Field of Classification Search
USPC .......................................... 713/187; 726/22
See application file for complete search history.

(56) References Cited

U.S. PATENT DOCUMENTS

| | | | | |
|---|---|---|---|---|
| 2006/0291504 | A1* | 12/2006 | Cohn | 370/473 |
| 2007/0100854 | A1* | 5/2007 | Lain et al. | 707/100 |
| 2009/0259993 | A1* | 10/2009 | Konduri et al. | 717/127 |

OTHER PUBLICATIONS

Visual Drawing Maker—Convert CAD files into self-veiweing executable (*exe) files, http://www.sharewareconnection.com/visual-drawing-maker.htm (last accessed Dec. 6, 2009).

* cited by examiner

*Primary Examiner* — Cordelia Zecher
(74) *Attorney, Agent, or Firm* — Kilpatrick Townsend & Stockton LLP

(57) ABSTRACT

Embodiments allow for use of fused files that comprise executable code and content data in a more user-friendly and flexible manner. For example, a fused file can include content data and application logic for editing the content data within the file. Security through the use of digital signatures can be supported, but with at least part of a file recognized as extensible so that the file can be edited without "breaking" the signature. Additionally, a computing device can be configured to utilize a "sandbox" environment so that extensible (and/or other) portions of a fused file do not introduce unacceptable security issues even if the digital signature is valid. In some embodiments, the support of extensibility and sandboxing allows a runtime environment to utilize installer-free operation, which can represent a significant advantage in that fused files can be widely distributed to any device utilizing the runtime environment.

19 Claims, 5 Drawing Sheets

METHODS AND SYSTEMS FOR FUSED FILES COMPRISING LOGIC AND CONTENT DATA

TECHNICAL FIELD

The disclosure below generally relates to computing systems, particularly to the use of computing systems to exchange files comprising both content data and application logic.

BACKGROUND

Typically, computer use involves one or more applications which, when executed by a computing system, configure the system to carry out logical operations defined in code for the application(s). These operations are used to generate, view, and/or edit content data, such as creating documents, images, and other data records that are stored as files. Usually, files and executable applications are maintained separately.

Some content files may contain macros, scripting, or other data defining logic to be carried out by an application that can read the content and decode the macros/scripting. For example, a Microsoft® Word® document can configure Word® (available from Microsoft Corporation of Redmond, Wash.) to carry out scripting operations. As another example, a web browser may display content of an HTML file while carrying out scripting operations defined in the file. Scripts and other embedded logic have been known to introduce security issues.

Some executable files may contain content data. For example, self-extracting archives can comprise a file having code that configures a computing system to decrypt and/or decompress data in the file. The archive may be distributed with a hash or other data comprising a "signature" for the file that can be used to verify the file's authenticity. As another example, the Adobe® AIR® runtime environment, available from Adobe Systems Incorporated of San Jose, Calif., allows use of application files via the runtime environment; these files may include content data. Before a file is used, it must be installed, and installation includes verifying a digital signature of the file.

SUMMARY

Embodiments of the present subject matter allow for use of files that comprise executable code and content data in a more user-friendly and flexible manner. Particularly, a fused file can include content data and application logic for editing the content data within the file. Security through the use of digital signatures can be supported, but a computing device can be configured to recognize at least part of a file as extensible so that the file can be edited without breaking the signature. Additionally, a computing device can be configured to utilize a sandbox environment so that extensible (and/or other) portions of a fused file do not introduce unacceptable security issues even if the digital signature is valid.

In some embodiments, the support of extensibility and sandboxing allows a runtime environment to utilize installer-free operation, which can represent a significant advantage in that fused files can be widely distributed to any device utilizing the runtime environment.

Embodiments include a method comprising accessing a fused file including content data and defining application logic and then allocating a namespace in memory of a computing system for use in executing the application logic. The method can determine if the program code is authentic based on a code signature, with the application logic executed if the program code is authentic. Determining if the program code is authentic can comprise determining if the file comprises an extensible portion and, if so, ignoring program code or other data in a portion of the namespace corresponding to the extensible portion. The method can comprise carrying out an operation defined by the application logic in a sandbox environment, with the sandbox environment comprising suitable processes/components that restrict a write operation defined by the application logic to a particular namespace or set of namespaces.

For example, the file can comprise a single file integrating content data and application logic, the application logic configured to cause the computing system to display the content data in a user interface. In some embodiments, the logic implements a photo viewer with some editing functionality. The data defining the photo may be viewed and changed in the file based on the included application logic. Some embodiments of the method can be carried out by a runtime environment operating on a computing system, while in other embodiments the capability may be provided by other elements of the computing system (e.g., an operating system).

Embodiments also include systems and computer-readable media implementing one or more aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
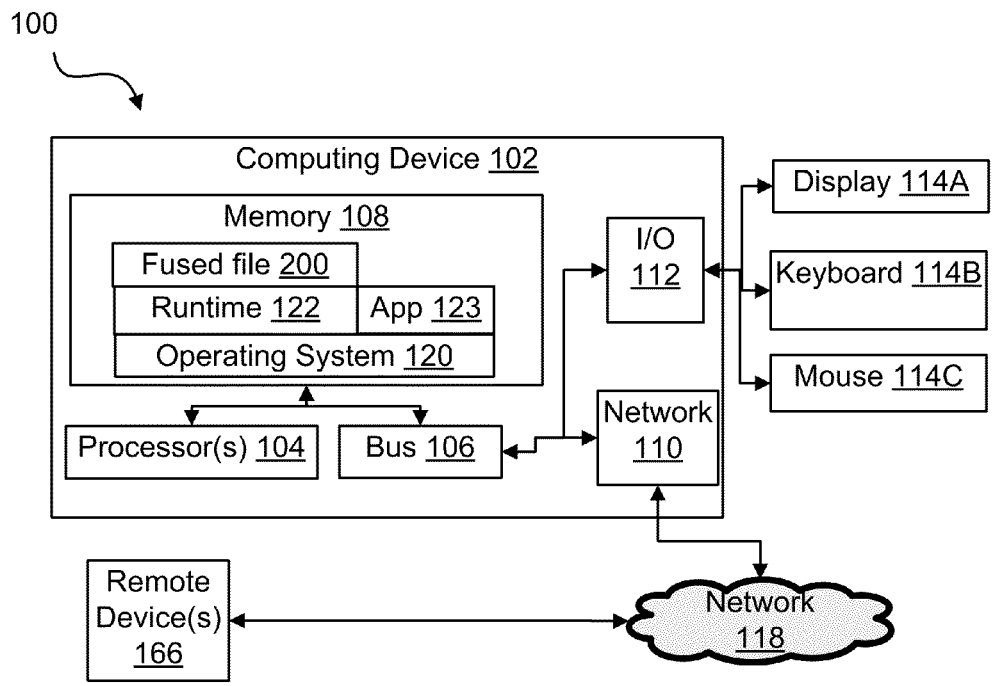
FIG. 1 is a block diagram of an illustrative computing device configured to utilize fused files.

FIG. 1 is a block diagram showing an illustrative system 100 including a computing device 102 configured to access and use a fused file 200 comprising content data and program code. In this example, computing device 102 comprises one or more processors 104, a bus (or busses) 106, tangible, non-transitory computer-readable medium (memory 108), a networking component 110, and several I/O components 114 linked to processor 104 via I/O interface(s) 112 and bus 106.

For example, memory 108 may comprise RAM, ROM, or other memory accessible by processor 104. I/O interface 112 can comprise a graphics interface (e.g., VGA, HDMI) to which display 114A is connected, along with a USB or other interface to which keyboard 114B and mouse 114C are connected. Networking component 110 may comprise an interface for communicating via wired or wireless communication, such as via Ethernet, IEEE 802.11 (Wi-Fi), 802.16 (Wi-Max), Bluetooth, infrared, and the like. As another example, networking component 110 may allow for communication over communication networks, such as CDMA, GSM, UMTS, or other cellular communication networks.

In this example, device 102 is in communication with one or more computing devices 116 via a network 118. As will be noted below, in some embodiments a fused file may contact one or more remote resources in order to access content data, application logic, and/or to facilitate communication. Device 116 is included to represent a server computing device or other device configured to communicate with device 102.

Computing device 102 is configured by program components embodied in the memory to provide a runtime environment 122 and a plurality of applications. Runtime environment 118 may, for example, comprise the Adobe® Flash® or AIR® environment available from Adobe Systems Incorporated of San Jose, Calif. or another runtime environment. In this example, runtime environment 122 and an application 123 run within an operating environment provided by operating system 120, with fused file 200 accessed and used via runtime environment 122.

Although in this example fused file 200 is accessed via runtime environment 122, the functionality providing support for fused files can be provided via another application (e.g., application 123) or by operating system 120 as a built-in feature. Additionally, although a fused file 200 may include sufficient logic to view content stored therein (or access the content remotely), in some embodiments external applications 123 can be configured to access fused file 200, write data to fused file 200, and/or create fused file 200. For instances, application 123 may comprise a development application such as Adobe® Flash® Builder® configured to output an fused file for use in the runtime environment. As another example, a content-centered application (e.g., a design or productivity application) can support export of documents as fused files, with the fused file including application logic to view the embedded document content.

Figure 2:
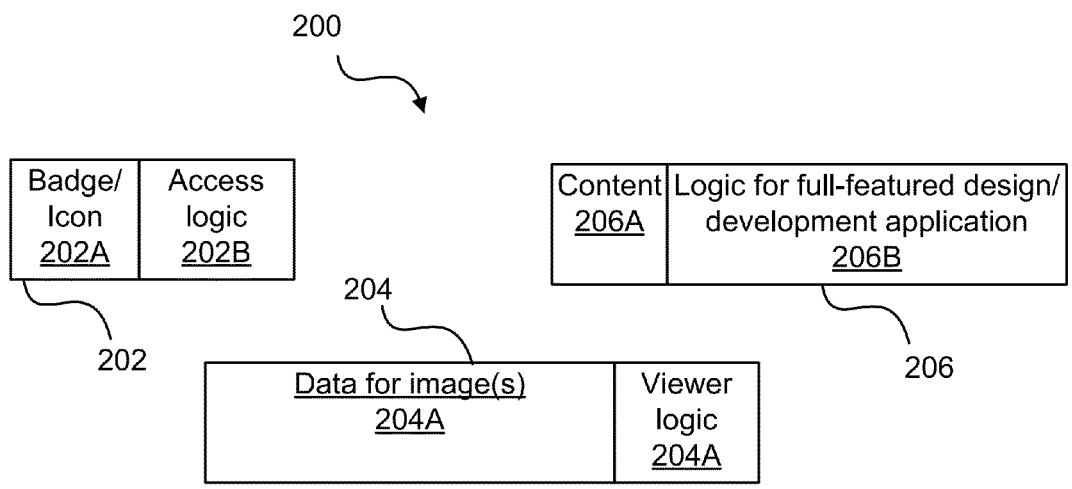
FIG. 2 depicts examples of the content of fused files.

FIG. 2 depicts examples of the content of a fused file 200. Example 202 provides a "minimal" file comprising a relatively small amount of content 202A and logic 202B. For example, content 202A may comprise an icon or "badge" for use in identifying the file, while logic 202B comprises application logic that configures a device using file 202 to access additional application logic and/or content from a remote resource. Example fused file 204 includes more content 204A than logic 204B. For example, file 204 may comprise a high-resolution image, a video, audio, or other file or collection of files with logic 204B comprising code for generating a viewer for the content. Example file 206 represents another combination of content and logic. For instance, a minimal amount of content 206A can be included, while logic portion 206B comprises logic for a full-featured editing, viewing, communication, or other application. Other fused files can embed additional information, such as cached network data, in the file.

Addition of content and/or logic data can be accomplished by recognizing an extensible namespace (or namespaces) so that changes in the extensible portion(s) do not affect authentication of the fused file. In some embodiments, a fused file may comprise no extensible portions. For example, an initial version of a file may include content data and application logic only. The file may, in some instances, include one or more namespaces without any content/logic as placeholders for later extensibility. Other fused files may not support extensibility, but may nonetheless leverage the advantage of including content and application logic in a single file and its support in a runtime environment or operating system.

Returning to FIG. 1, runtime environment 118 configures computing system 100 to access the program code in the file, identify a namespace defined in the file, the namespace corresponding to an extensible portion of the file, and execute the application logic. When executing the application logic, the runtime environment configures the computing system to allow changes data in the extensible portion of the file while restricting the changing of data outside the extensible portion of the file based on the namespace. For instance, runtime environment 118 can configure the system to execute the application logic in a "sandbox," in which write operations are limited to the extensible namespace and/or other locations that will not allow for introduction of malicious code or deletion of critical data.

Additionally, runtime environment 118 can configure computing system 100 to determine if the fused file is authentic based on a digital signature, with portions of the program code and/or content corresponding to the extensible namespace are not considered in determining if the program code is authentic. This can allow for the fused file to change its content without breaking the signature and presenting a false alarm. In some embodiments, the use of authentication that recognizes extensibility and a sandbox mode allows for "installer-free" use of the fused file. This can advantageously lead to a smoother experience for users.

Figure 3:
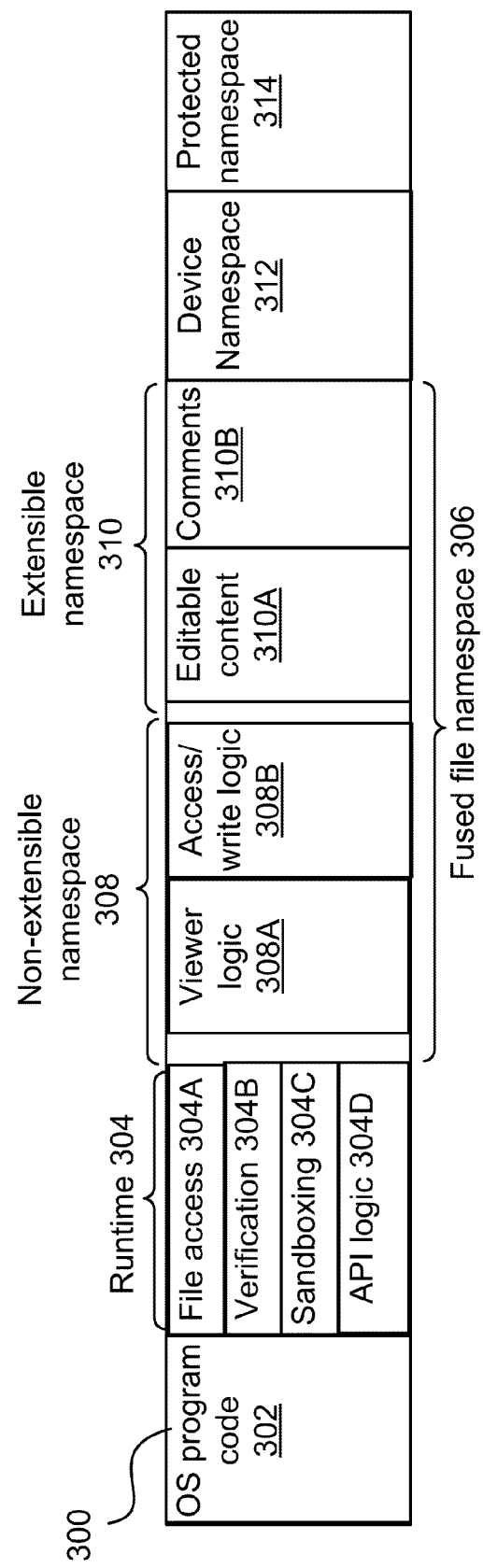
FIG. 3 illustrates a memory map of a computing device utilizing a fused file in closer detail.

FIG. 3 illustrates a memory map 300 of a computing device utilizing a fused file. For example, portion 302 may correspond to program code and components of an operating system. Portion 304 may correspond to components of a runtime environment. For example, the program code 302 can comprise instructions that cause the runtime environment, as embodied by program code 304, to be invoked upon selection of a fused file in a user interface.

Program code 304 can comprise code of the runtime environment that calls on system resources via operating system 302 (and/or directly) and carries out functionality exposed via an application programming interface (API) to applications executed within the runtime environment. In this example, runtime 304 includes file access/initialization logic 304A, which configures the runtime environment to locate files, allocate memory space, and begin the execution process. Verification logic 304B configures the runtime environment to check fused (and/or other) files against digital signatures or other reference data.

Sandboxing logic 304C and API logic 304D represent components of the runtime environment that act based on application logic invoking the APIs of the runtime environment. For example, application logic can be defined in terms of code elements that define object classes, programmatic methods, events, and overall program flow. The code elements can be compiled or interpreted to invoke the functionality of the runtime environment via its APIs. Additionally, in accordance with the present subject matter, the API logic is configured to utilize sandboxing logic 304C in order to restrict potentially-dangerous application logic.

In accordance with the present subject matter, the runtime environment has allocated a namespace 306 for use of the fused file. Namespace 306 includes a first, nonextensible portion 308 and a second, extensible portion 310. Some embodiments may feature multiple extensible or nonextensible namespaces.

For example, the fused file may be segmented into signed and unsigned portions, which can be considered namespaces or application domains. The demarcation between segments may simply identify multiple sections, each tagged as signed (and therefore in one security domain) or unsigned. As another example, a finer-grained, hierarchical structure, such as a descriptor tree, can be used in some embodiments. The namespaces can be identified by a secure, signed table of contents included in the file.

In any event, a portion of the fused file can be marked as extensible, with the extensible portion identified in data that is stored in the nonextensible portion. The extensible portion may be an empty sub-container (e.g., node in the tree structure), an editable section (e.g. read/write access allowed), or a section that may be appended to. However, a fused document containing data outside the extensible or nonextensible portion can be considered invalid.

Nonextensible portion 308 in this example comprises application logic of the fused file, shown here as viewer logic 308A and access/write logic 308B. Viewer logic 308A can include functions and event handlers that logic of the runtime environment in order to generate a user interface, while access/write logic 308B can access data in the namespace (and/or elsewhere), perform write/communications operations. Viewer logic 308A can use the accessed data and suitable decompression or other methods to, for example, display image content.

In this example, extensible portion 310 that includes editable content 310A and comments 310B. For example, content 310A may comprise data representing images, text, sound, or any other type of data. Comments 310B can comprise data representing comments added by various users who have previously accessed the fused file in namespace 306. For example, viewer logic 308A may present an interface for entering comments regarding the editable content along with edits thereto. The updated content can be stored at 310A and comment data can be stored at 310B.

When the runtime environment accesses the fused file and allocates namespace 306, the runtime environment can identify extensible portion 310. Portions of the fused file corresponding to extensible portion 310 are not subject to the same type of signature check for the non-extensible portion(s). Instead, the fused file can be verified to ensure that the non-extensible portions (in this example, portion 308) match the signature. Verification logic 304B may, for example, comprise a hash function that checks a digital signature of the fused file. In some embodiments, the digital signature is evaluated based on the fused file as stored and before loading components thereof into memory.

This may allow, for example, for logic 308A/308B to perform write operations in namespace 310 when the fused file is utilized, or for another application to add, change, or remove data/logic from namespace 310 without changing how the fused file is treated in subsequent operations. On the other hand, a change to logic 308 or the identifying information for the file would result in a variation of the hash or other signature verification results.

In this example, the application logic is in nonextensible portion 308 and content data is in extensible portion 310. It will be understood that some or all content data of a fused file may be included in a non-extensible portion. For instance, image data may be distributed with the image portion in a protected namespace along with logic in the file for storing modified versions in the extensible namespace. The file can be distributed to one or more designers/editors for adjustment while preserving the original data for later use or comparison.

Additionally or alternatively, application logic can be added or changed in extensible portion 310. For instance, a fused file may be distributed with basic functionality for viewing content therein. The application logic can further support accessing a remote device and downloading additional application logic that is saved in portion 310. For example, more advanced viewing and/or edit functionality may be added.

FIG. 3 also illustrates namespace 312 corresponding to user-accessible devices. For example, namespace 312 may comprise a portion of memory 300 to which data is written by operating system 302, runtime 304, and other applications, such as in "File→Save" type operations. Protected namespace 314 is also shown and may, for example, correspond to system files used by operating system 302 (e.g., library files, system settings) and/or private data.

As noted above, runtime 304 includes sandbox logic 304C that ensures that code from namespace 306 operates in a "sandbox" environment. The sandbox environment can comprise an environment where write operations (and/or other operations) are restricted. For example, logic of an application running in the runtime environment may be prevented from writing to a protected namespace such as namespace 314. As an example, logic 304C may receive information from API logic 304D identifying a write operation requested by a program component from namespace 306. Sandbox logic 304C can evaluate a namespace specified in the write operation, and if the write operation specifies a protected area (e.g., any of namespaces 302, 304, 308, or 314), the write operation may be disallowed. As another example, any write operation other than one specifying an area within the sandbox (in this example, namespace 310 or 312) may be disallowed. Sandboxing logic 304C may evaluate other operations invoked by application logic in namespace 306 as well.

Although logic 304C and 304D are shown separately, in some embodiments the sandboxing logic can be integrated into the logic that exposes the API of the runtime environment. Additionally, in some embodiments OS code 302 includes the verification, sandboxing, and other features noted herein to support fused files directly without the need for a runtime environment.

Figure 4:
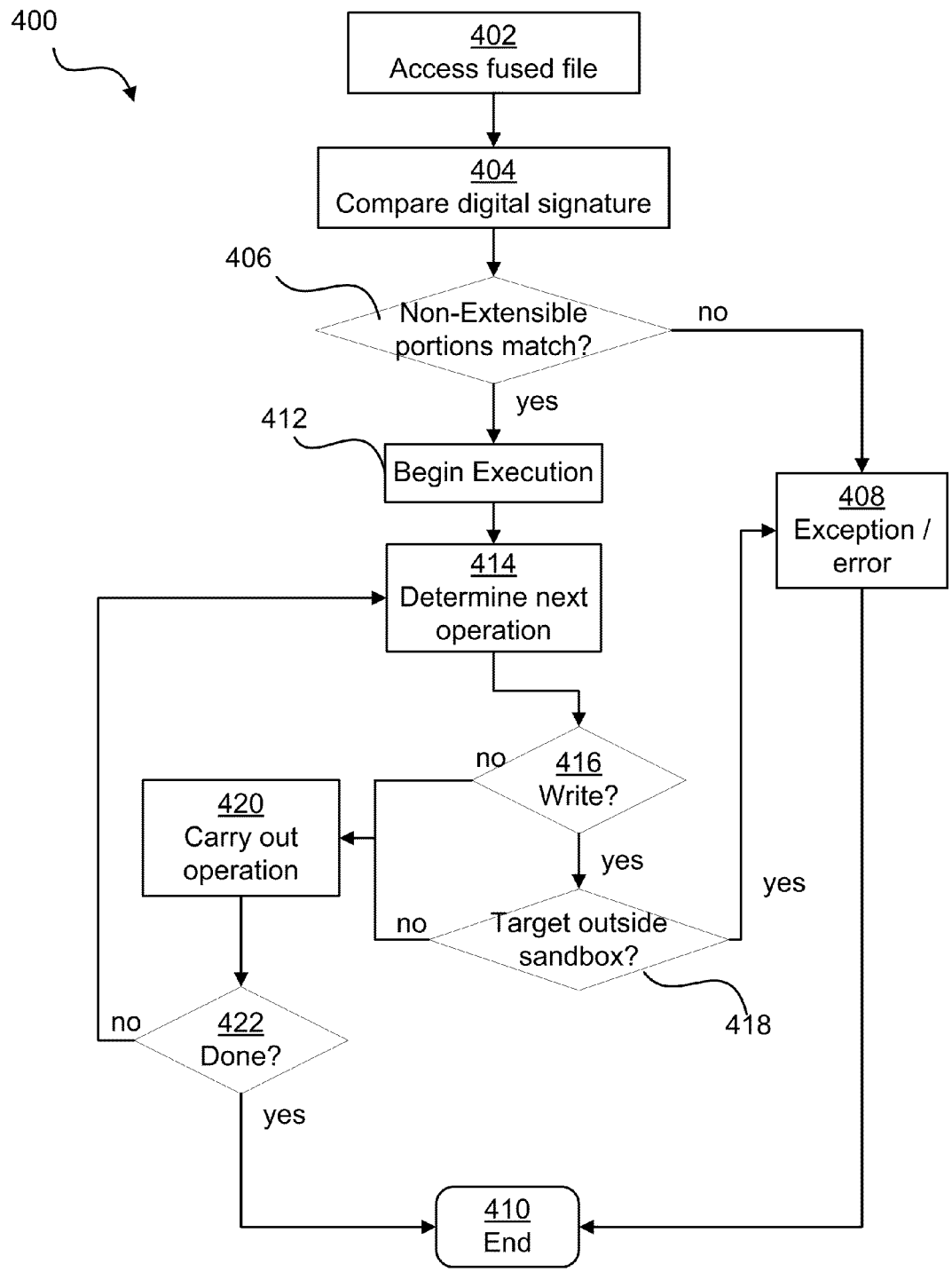
FIG. 4 is a flowchart showing exemplary steps in a method of using a fused file.

FIG. 4 is a flowchart showing exemplary steps in a method 400 of using a fused file. Block 402 represents accessing a fused file comprising content and program code in a single combined file. For example, a user may choose to utilize the file by double-clicking on the file in a browsing interface. In response, a runtime environment associated with the fused file type or fused file access capabilities of the operating system can be invoked.

Block 404 represents comparing a digital signature for the fused file to a reference. For example, the fused file may have a corresponding hash or digital signature reference file stored at the computing device. As another example, the digital signature may be embedded in the fused file and/or may be accessible from a remote server. In comparing the digital signature for the fused file, one or more extensible portions of the file can be identified if any are present, with the digital signature verification proceeding based on non-extensible portions of the file. As an example, when the fused file is loaded into memory, a namespace corresponding to an extensible portion can be identified, such as using a descriptor table. A hashing or other algorithm can be used on portions of the fused file outside that namespace, with the hash results compared to the digital signature to identify match.

For example, in some embodiments a fused file contains at least one secure, signed table of contents. The table of contents an include a list of modules (e.g., code, data, metadata, content) and corresponding signatures that are part of the initial, secured package. If either (or both) the table of contents are changed, such an action will invalidate the base signature and this will be apparent at block 404.

Block 406 represents a decision point based on the match. If the non-extensible portion(s) do not match the digital signature, then program flow proceeds to block 408, which represents calling an exception. In this example, program flow then ends at block 410, since the lack of a verifiable digital signature could indicate an undesired change to the non-extensible portion or inadvertent corruption that may represent a security risk. However in some embodiments an error message may be displayed with an option for flow to be continued despite the risk.

Returning to block 406, if the digital signature matches (or if a user chooses to proceed despite a mismatch), then flow moves to block 412, which represents beginning execution of application logic in the fused file and block 414, which represents determining the next operation to carry out as defined in the application logic. For example, the application logic may cause the computing device to instantiate instances of objects, pass events, and carry out methods with the aid of a runtime environment or capabilities of an operating system.

As noted above, a table of contents or other descriptive data for the fused file can be included in the secured/signed portion to identify the extensible portion(s) of the fused file. Any content not hierarchically contained within the secured base package or the predefined extensible container(s) can invalidate the package, and so block 406 may further comprise determining if the fused file comprises any portions other than the extensible and non-extensible portions as set forth in definition data for the fused file.

In this example, at block 416 represents determining if the application logic has invoked a write operation. If so, then flow moves to block 418, which represents determining whether the target of the write operation is outside a sandbox environment. For example, the runtime environment or operating system may be configured with a set of parameters defining the sandbox environment in terms of permissible and/or prohibited namespaces to which logic of a fused application can write.

Typically, the sandbox can allow limited write access to a namespace corresponding to local storage (e.g., to support "Save" operations) as well as write access to namespaces corresponding to extensible portions of the fused file itself. On the other hand, changes to protected namespaces (e.g., deletion or changes to system files, changing variable values/names for the operating system, runtime environment, or non-extensible code in memory, changing stored nonextensible portions of the fused file) can be prohibited to avoid malicious activity.

As shown at block 418, if the command target is within the sandbox, then the operation is carried out at block 420. At block 422, the method determines if execution is complete, with flow ending at 410 if so. If further operations remain to be carried out, then flow returns to block 412. If a command attempts to write outside the sandbox, then flow moves to block 408 for exception handling.

Returning to block 416, if a write operation is not invoked, flow moves directly to block 420, where the operation is carried out. In this example, the write target of a command is used, but in some embodiments other types of commands may be evaluated in enforcing the parameters defining the sandbox. For instance, the parameters defining the sandbox may restrict read access and other operations (e.g., delete, move) to the extent those other operations are separable from "write" operations. Thus, it will be understood that a given operation can be subject to multiple tests before it can be carried out.

In this example, block 404 included evaluating a digital signature for a nonextensible portion of the fused file. Some embodiments support authentication of the extensible portion(s) in addition to authenticating the non-extensible portions. For example, a tree structure, table of contents, or other identifying information for a fused file may include a signature for an extensible component in order to allow for cryptographically secure histories of incremental additions to the file.

Figure 5:
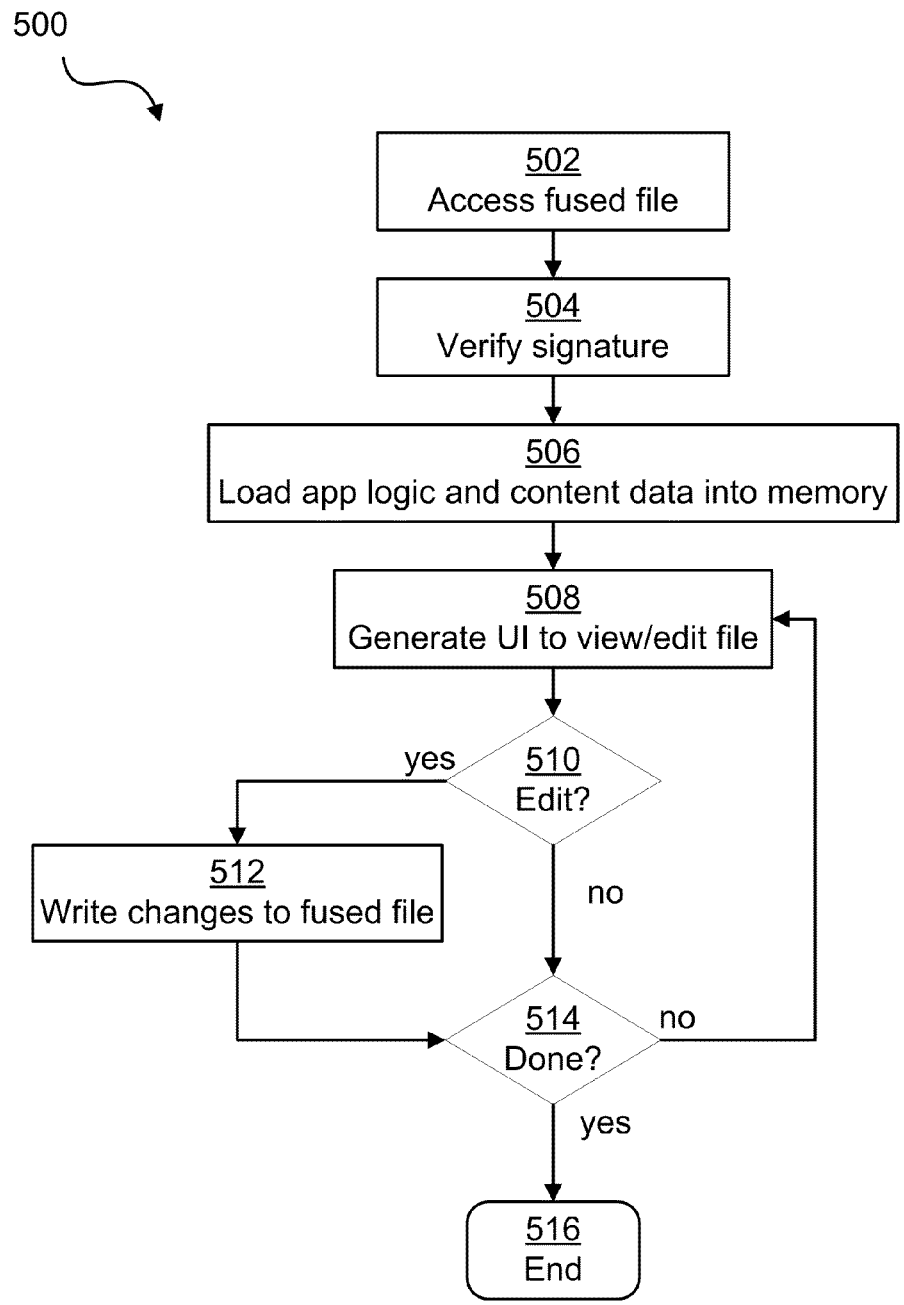
FIG. 5 is a flowchart showing a particular example of using a fused file.

FIG. 5 is a flowchart showing a method 500 representing a particular example of using a fused file. Block 502 represents accessing a fused file comprising image data, such as a photograph or video along with application logic for displaying and/or editing the image data. Block 504 represents verifying the file against a digital signature. As noted above, the extensible portion(s) of the file (if any) can be identified and excluded from verification and/or subjected to different verification (e.g., the editing history tracking noted above).

At block 506, the application logic and content data are loaded into memory, and at block 508 the application logic is executed to generate a user interface. For example, the application logic can define various on-screen containers and menus which utilize algorithms to decode and display the image data by invoking functions of the runtime environment and/or operating system via APIs.

As a particular example, the application logic can generate a viewer that causes a computing system to access and display content of a *PSD document formatted for use with Adobe® Photoshop®, even if the computing system does not have access to Photoshop® or another application/service for viewing *PSD documents. For instance, a viewing window can be generated along with a layers palette to control the display of one or more layers in the document.

Block 510 represents determining if an edit command has been invoked. For example, limited editing capabilities may be included in the application logic, such as software methods for adjusting the white balance, brightness, contrast, or other aspects of the image. If, at block 510, an edit command has been invoked, then flow moves to block 512, which represents writing changes as specified by the edit to the content data in the fused file. Depending on the configuration of the file, the changes may be made so as to replace the original data or to add a version in an extensible namespace. Then, flow proceeds to block 514 and on to block 516 if execution is complete.

Figure 6:
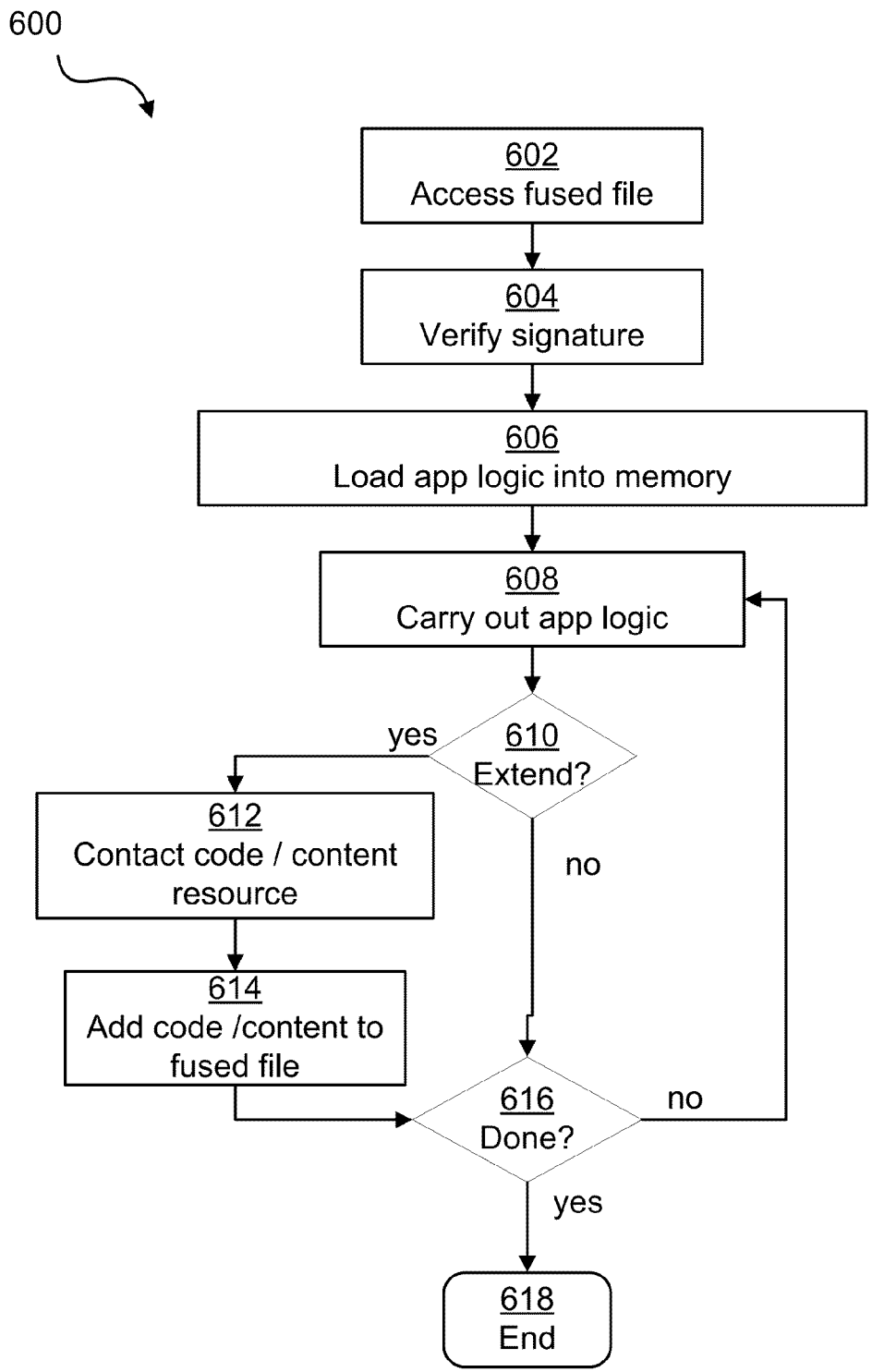
FIG. 6 is a flowchart showing an example of using and extending a fused file.

FIG. 6 is a flowchart showing a method 600 representing a particular example of using a fused file, including addition of additional code and/or content data. Similar to method 500 in FIG. 5, method 600 at block 602 accesses a fused file, which can comprise content data and application logic. At block 604, the signature of the file is verified, and at block 606 the application logic is loaded into memory and the application logic begins execution at 608.

In this example, the method includes a block 610 representing a decision point on extending the fused file. For example, the fused file can comprise application logic for a design application (e.g., for editing images, video, sound, etc), productivity software (e.g., word processing, document viewing assembly, spreadsheet, database management, email or other communication, etc.), or a development application (e.g., for designing a web site, designing a conventional application or a fused file, etc.). The fused file may initially correspond to a "basic" version with application logic having limited capabilities. However, the application logic may define an interface for selecting one or more additional components, such as components corresponding to additional application functions/capabilities. Additionally or alternatively, the application logic may allow for addition of content data, such as image/code libraries, document templates, and the like.

If an extension is desired, then flow moves to block 612, which represents contacting one or more resources that provide code and/or content. For example, a web service or other remote computing system may provide an interface for locating, selecting, and downloading application components or content for a fee. The fused file may include data for contacting multiple different services in some embodiments. As another example, extension may comprise contacting a remote server to obtain data from other instances of the fused file being edited elsewhere. For example, a fused file can be distributed, with the file comprising content of a collaborative project, logic for viewing/editing, and logic for accessing a coordinating server (or collaborating peer) to obtain updates.

In some embodiments, available extensions are listed directly and/or indirectly. As an example, a direct listing may be included the secure table of contents. Each extension may include an address (e.g. URL) and signature for verifying the extension. As an example of an indirect listing, the secure table of contents may include public key certificate information indicating allowed extension providers.

In any event, once the additional information is located, then flow moves to block 614 where the added code/content is added to the fused file. For instance, additional application logic can be added to one or more namespaces corresponding to an extensible portion of the file. If collaborative data or other content data has been accessed, it can be stored in a namespace accessible by the application logic for viewing the content data.

At block 616, if program flow is not complete, then the method returns to block 608. If additional logic has been added, then the additional logic can also be executed in order to allow use of the new functionality. If additional content has been added to the file, the additional content can be available for viewing, editing, export, etc. through use of the application logic. Flow can continue until, at block 616, the method determines that execution is complete and the method ends at block 618.

The extensible components may be distributed free of charge and/or in exchange for a fee. For example, a digital image can be distributed in a fused file comprising a low-resolution image along with application logic for contacting a payment processing server configured to coordinate a transaction (e.g., credit card payment). The server can provide a higher-resolution version of the digital image for inclusion in the fused file. As another example, additional application logic can be accessed and added to the fused file in exchange for a payment coordinated in a similar manner. For instance, a fused file may be distributed with content viewing capabilities, with application logic for sharing, editing, or otherwise manipulating content made available for a fee.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method, comprising:
    accessing program code comprised in a file and defining application logic;
    allocating a namespace in memory of a computing system for use in executing the application logic;
    determining that the program code is authentic based on a code signature; and
    executing the application logic in response to determining that the program code is authentic,
    wherein determining that the program code is authentic comprises:
        determining that the file comprises an extensible portion, and
        based on determining that the file comprises the extensible portion, evaluating program code or other data in a first portion of the namespace based on the code signature but excluding program code or other data in a second portion of the namespace from consideration by an authentication process for determining that the program code comprised in the file is authentic, the second portion of the namespace corresponding to the extensible portion.

2. The method set forth in claim 1, wherein executing the application logic comprises:
    carrying out an operation defined by the application logic in a sandbox environment, wherein the sandbox environment restricts a write operation defined by the application logic to a particular namespace or set of namespaces.

3. The method set forth in claim 2, wherein the particular namespace comprises the second portion of the namespace allocated for use in executing the application logic.

4. The method set forth in claim 1,
    wherein the file comprises a single file integrating content data and the application logic, the application logic configured to cause the computing system to display the content data in an interface.

5. The method set forth in claim 4, wherein the application logic is further configured to cause the computing system to change or add to the content data in response to input received by the interface.

6. The method set forth in claim 4, wherein the application logic is configured to cause the computing system to access additional program code from a remote resource and to execute additional application logic defined in the additional program code.

7. The method set forth in claim 1, wherein accessing, allocating, determining, and executing are carried out by a runtime environment provided by the computing system.

8. The computer-implemented method of claim 1, wherein the extensible portion comprises data changeable by the computing system executing the application logic and wherein data outside the extensible portion of the file is restricted from being changed by the computing system executing the application logic.

9. The computer-implemented method of claim 1, wherein ignoring the program code or other data in the second portion of the namespace comprises determining that the program code of the file is authentic by only evaluating the program code defining the application logic of the file based on the code signature.

10. The computer-implemented method of claim 1, wherein the application logic is included only in the first portion of the namespace and wherein the second portion of the namespace comprises only content data.

11. A computer program product comprising a tangible, non-transient computer readable medium embodying program code executable by a computing system, the program code comprising
    program code that configures the computing system to access a fused file;
    program code that configures the computing system to determine that content of the fused file is authentic based on a code signature; and program code that configures the computing system to execute application logic defined in the fused file in response to determining that the content of the fused file is authentic;

wherein determining that the content is authentic comprises:
  identifying a namespace defined in the fused file,
  determining that the fused file comprises an extensible portion, and
  based on determining that the fused file comprises the extensible portion, evaluating program code or other data in a first portion of the namespace based on the code signature but excluding program code or other data in a second portion of the namespace from consideration by an authentication process for determining that the program code comprised in the file is authentic, the second portion of the namespace corresponding to the extensible portion.

12. The computer program product set forth in claim 11, wherein the program code that configures the computing system to execute the application logic provides a sandbox environment, wherein the sandbox environment restricts a write operation defined by the application logic to a particular namespace or set of namespaces.

13. The computer program product set forth in claim 12, wherein the particular namespace comprises the second portion of the namespace.

14. The computer program product set forth in claim 11, wherein the fused file comprises a single file integrating content data and the application logic, the application logic configured to cause the computing system to display the content data in an interface when executed.

15. The computer program product set forth in claim 14, wherein the application logic is further configured to cause the computing system to change or add to the content data in response to input received by the interface.

16. The computer program product set forth in claim 14, wherein the application logic is configured to cause the computing system to access additional program code from a remote resource and to execute additional application logic defined in the additional program code.

17. The computer program product set forth in claim 14, wherein the program code for accessing, determining, and executing are comprised in a runtime environment.

18. A computing system comprising a processor configured to access a computer readable medium tangibly embodying a runtime environment that configures the processor to perform operations comprising:
  accessing a fused file comprising content data and application logic;
  determining that the application logic is authentic based on a code signature; and
  executing the application logic using a namespace in the computer readable medium in response to determining that the application logic is authentic,
  wherein determining that the application logic is authentic comprises:
    determining that the fused file comprises an extensible portion, and
    based on determining that the fused file comprises the extensible portion, evaluating only the application logic in a first portion of the namespace based on the code signature and excluding the content data in a second portion of the namespace from consideration by an authentication process for determining that the program code comprised in the file is authentic, the second portion of the namespace corresponding to the extensible portion.

19. The computing system of claim 18, wherein executing the application logic further comprises causing the processor to generate an interface configured to output the content data.

* * * * *